Sept. 30, 1952 — C. W. GOULD — 2,612,526
PENTAERYTHRITOL MANUFACTURE
Filed June 22, 1950
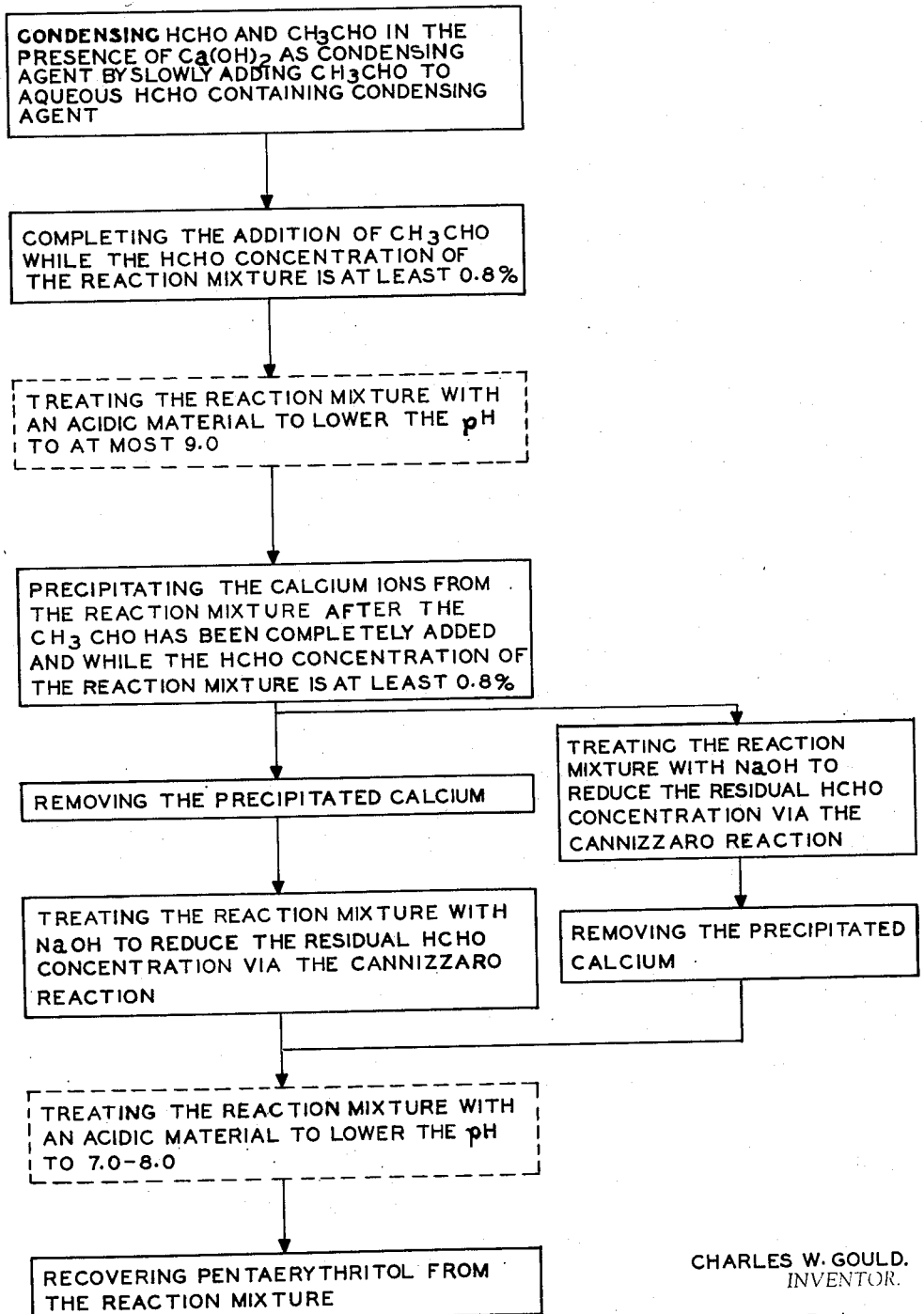
CHARLES W. GOULD.
INVENTOR.
BY Ernest G. Peterson
AGENT.

Patented Sept. 30, 1952

2,612,526

UNITED STATES PATENT OFFICE 2,612,526

PENTAERYTHRITOL MANUFACTURE

Charles W. Gould, Wilmington, Del., assignor to Hercules Powder Company, Wilmington, Del., a corporation of Delaware Application June 22, 1950, Serial No. 169,753

19 Claims. (Cl. 260—635)

This invention relates to the manufacture of pentaerythritol. More particularly, it relates to a process for the manufacture of pentaerythritol using lime or $Ca(OH)_2$ as condensing agent whereby there is obtained a product of exceptionally low phthalate ester color.

A very important characteristic of a pentaerythritol is its phthalate ester color. This is particularly so when the pentaerythritol is to be employed as the polyhydric alcohol in the manufacture of phthalate alkyd resins. Briefly described, the phthalate ester color of a pentaerythritol has reference to the color of a ⅞" thickness of a phthalate ester of the pentaerythritol prepared under standard conditions. The phthalate ester color of a pentaerythritol is expressed numerically, and the numbers used refer to an arbitrarily defined color scale. Spectrophotometric readings on numerous samples of pentaerythritol phthalate esters prepared under the standard conditions have indicated that the colors can be graded on the $x$-trichromatic scale, basis of Illuminant C. Accordingly, this scale has been arbitrarily divided into equal intervals over the range of color likely to be encountered and these numbered 0 to 10. A pentaerythritol having a phthalate ester color of 0 is productive of a phthalate ester which is water-white in color, etc. This matter is discussed more fully hereinafter, and the standard test for determining phthalate ester color is set forth.

Lime or calcium hydroxide is a well-known catalyst or condensing agent for pentaerythritol manufacture. (The terms "catalyst" and "condensing agent" as used herein have the same meaning and are used interchangeably.) It possesses certain advantages over other known condensing agents for formaldehyde and acetaldehyde. For example, the use of lime as condensing agent generally results in somewhat higher yields of crystalline product as compared with the use of caustic soda. The lime-condensed crystalline product also has on the average a somewhat higher pentaerythritol monomer content, i. e., the pentaerythritol monomer content of the crystalline product as determined by dibenzal analysis is somewhat higher in the case of the crystalline product obtained from a lime-condensed reaction.

The above factors favor the use of lime as condensing agent over caustic soda. However, it has been exceedingly difficult, if not impossible, to obtain pentaerythritol having a low phthalate ester color on the basis of a lime-condensed reaction. Pentaerythritols having phthalate ester colors of the order of 5.5 to 7.5 are the rule in the case of lime condensation. Such a pentaerythritol does not meet the color requirements which have been established for phthalate alkyd resin manufacture. For many end uses phthalate alkyd resins prepared from such pentaerythritols have no practical utility. In other cases the utility of these resins is borderline. It is obvious, therefore, that the poor phthalate ester color of lime-condensed pentaerythritols represents a technical problem of some real significance to this art.

One important feature of this invention relates to the condensation step of the overall process for making pentaerythritol. It has now been found that, in order to obtain a pentaerythritol of low phthalate ester color when $Ca(OH)_2$ is used as condensing agent, it is quite important that the acetaldehyde be added to the formaldehyde in the form of an aqueous solution containing condensing agent in such a manner that the concentration of acetaldehyde in the reaction mixture at no time builds up to an appreciable value. This requirement is accomplished by adding acetaldehyde continuously and slowly to formaldehyde in aqueous solution, maintaining the formaldehyde concentration of the reaction mixture during the addition of acetaldehyde sufficently high to promote rapid reaction of the acetaldehyde with the formaldehyde, and stopping the addition of the acetaldehyde prior to the point where the formaldehyde remaining in the reaction mixture is so dilute that rapid reaction of the acetaldehyde with formaldehyde is not possible. It has been determined experimentally that the minimum formaldehyde concentration of the reaction mixture which will provide reasonably rapid reaction of acetaldehyde with formaldehyde is about 0.8% by weight. Hence, it is important to maintain the formaldehyde concentration of the reaction mixture at or above this concentration during the period of addition of acetaldehyde and to stop the addition of acetaldehyde at or above this concentration. As a practical matter, to provide a factor of safety in the reaction it is preferred to carry out the process in such a manner that the formaldehyde concentration of the reaction mixture is maintained at or above 1.0% during the addition of acetaldehyde and the addition of acetaldehyde is stopped at or above this minimum concentration. If at any time during the reaction a substantial quantity of acetaldehyde is allowed to build up in the reaction mixture, the self-condensation of acetaldehyde with itself is favored, producing polyacetaldehyde condensates which are severe contributions to high phthalate ester color. If, however, the condensation is carried out along the lines above-indicated, the acetaldehyde polymerization reaction is minimized and pentaerythritol having exceedingly low phthalate ester colors, i. e., phthalate ester colors of the order of 2.0 to 3.5, can be isolated from the reaction mixture by the usual proceedings.

The usual procedures for working up the reaction mixture involves precipitation of the calcium ions from the reaction mixture, filtration of the precipitate from the reaction mixture, evaporation (preferably under vacuum) of the reaction mixture and crystallization of the pentaerythritol from the reaction mixture.

To achieve a reaction mixture having a formaldehyde concentration of 0.8% or above, preferably 1.0% or above, at the time all of the acetaldehyde has been added, one may employ various expedients. One expedient is to use a molar ratio of formaldehyde to acetaldehyde substantially higher than the theoretical molar ratio of 4.0 required for the reaction in conjunction with an aqueous formaldehyde of the usual concentration used for pentaerythritol production (20% or thereabouts). For example, use of formaldehyde and acetaldehyde in the molar ratio of 4.5 in conjunction with 20% formaldehyde will provide a formaldehyde concentration of the reaction mixture after all the acetaldehyde has been added of well over 1.0%. The desired result may also be achieved by using formaldehyde to acetaldehyde ratios well below 4.5 by starting with an aqueous formaldehyde having a higher formaldehyde concentration in the beginning. Furthermore, the reaction mixture may be fortified with formaldehyde toward the end of the reaction to maintain the formaldehyde concentration of the reaction mixture above 0.8% during the entire period that acetaldehyde is being added to the reaction mixture.

It is evident from what has been said heretofore that it is not necessary to place all or substantially all of the formaldehyde in the reactor at the beginning of the run. For example, 50% or even less of the total formaldehyde may be used initially and the remainder added at intervals throughout the condensation step. In fact, it is only required in so far as this invention is concerned that the concentration of formaldehyde in the reaction mixture be above 0.8%, which is the minimum concentration at which reasonably rapid reaction with acetaldehyde takes place, during the period of addition of acetaldehyde. Hence, it is possible to start out a given run with only a small proportion of the total formaldehyde in the reactor, the remainder of the formaldehyde being added at intervals throughout the condensation step. When the process is carried out in this way, more care must be exercised to make certain that the formaldehyde concentration of the reaction mixture is always at or above the minimum for reasonably rapid reaction of the acetaldehyde, as compared with a process in which substantially all of the formaldehyde is in the reactor in the beginning. It is for this reason that the preferred procedure of this invention comprises slow addition of acetaldehyde to substantially all of the formaldehyde.

While the process described above provides a pentaerythritol having a very desirable phthalate ester color, the process is impractical from several points of view. In the first place, the relatively high concentration of formaldehyde in the reaction mixture raises a problem in the recovery step due to the fact that the formaldehyde seems to act as a solvent for the pentaerythritol. At any rate the yield of crystalline product is much lower than that which is normally obtained in a calcium-catalyzed reaction. Furthermore, it is usually difficult to induce crystallization of the concentrated reaction mixture. At the same time high concentration of the formaldehyde in the reaction mixture gives rise to formaldehyde fumes in the plant. Aside from being disagreeable to the workers in the plant, these fumes present a health hazard.

It has been further found that advantage may be taken of the above discovery and at the same time the disadvantages abovementioned avoided by proceeding as follows. The important steps in this second discovery are the removal of the calcium ions from the reaction mixture and the reduction of the formaldehyde concentration of the reaction mixture to a lower level by treatment with NaOH.

When solutions of formaldehyde are heated to temperatures in the range of 50–75° C. with sufficient sodium hydroxide to raise the pH above 9, the formaldehyde concentration is readily reduced to a few tenths of one per cent by the Cannizzaro reaction. If, however, calcium ions are present in an alkaline solution of formaldehyde similarly treated, another type of reaction takes place besides the Cannizzaro reaction. This second reaction is the formation of sugar-like formaldehyde polymers which, in the presence of calcium ions, are autocatalytic. Before the formaldehyde can be reduced to the desired level, the polymerization reaction overtakes the Cannizzaro reaction and a colored reaction mixture results. These formaldehyde polymers also contribute to high phthalate ester color in the resulting pentaerythritol. Since the calcium ion is apparently necessary for this undesired reaction, it can be circumvented by removing the calcium ion prior to destroying the formaldehyde by the Cannizarro reaction. After reduction of the formaldehyde concentration, the reaction mixture is worked up by the usual steps of evaporation (preferably under reduced pressure) and crystallization to provide a crystalline product.

The reduction of the formaldehyde concentration of the reaction mixture may be effected to any desired extent. In general, the greater the reduction of the formaldehyde content, the less one has to contend with a fume problem in the operation. Furthermore, the greater the reduction in formaldehyde concentration, the greater the yield of crystalline product. It is preferred that the formaldehyde concentration of the reaction mixture be reduced to 0.6% or below.

The salient advantage of the process of this invention is of course that the pentaerythritol obtained is much improved with respect to phthalate ester color as compared with the pentaerythritol which normally results from calcium-condensed reactions. Thus, it is possible using the principles underlying this invention to make pentaerythritol having a phthalate ester color of 2.0 to 3.5. Furthermore, crystalline pentaerythritol is obtained in equally as high yield as in the conventional lime-condensed reactions. Also, the pentaerythritol monomer content of the crystalline product is at least as high and in some cases higher as compared with products of the conventional lime-condensed processes.

This invention relates to a process which takes advantage of both of the aforesaid discoveries. Broadly described, it comprises condensing formaldehyde and acetaldehyde in the presence of Ca(OH)₂ as condensing agent by slowly adding acetaldehyde to formaldehyde in the form of an aqueous solution containing condensing agent, the formaldehyde concentration of the reaction mixture during the entire period of addition of acetaldehyde being at least 0.8% by weight, the aldehydes being employed in such proportions that at the time the acetaldehyde has been completely added the formaldehyde concentration of the reaction mixture is at least 0.8% by weight. The addition of acetaldehyde is completed while the formaldehyde concentration of the reaction mixture is at least 0.8% by weight. The next step involves precipitation of the calcium ions from the reaction mixture while the formaldehyde concentration of the reaction mixture is at least 0.8% by weight. Preferably, the resulting precipitate is removed at this point. Thereafter, the resulting calcium-free reaction mixture is treated with NaOH to reduce the residual formaldehyde concentration via the Cannizzaro reaction. If the precipitated calcium ions were not removed prior to the last step they are removed at this point. Finally, pentaerythritol is recovered from the reaction mixture.

The invention is also shown in its broad aspect in the attached drawing. The drawing is self-explanatory. As illustrated, there are two alternative courses to follow once the precipitation of the calcium ion from the reaction mixture has been effected. One of these alternatives is to remove the precipitated calcium ion and then treat the reaction mixture with NaOH to reduce the formaldehyde concentration via the Cannizzaro reaction. The other alternative involves simply these steps in reverse order. The steps enclosed by broken lines are steps which are not necessary to achieve an operable process but which are preferably employed. Thus, the step following the completion of addition of acetaldehyde which comprises treating the reaction mixture with an acidic material to lower the pH to at most 9.0 is an optional step. Similarly, the step following the formaldehyde reduction step of treating the reaction mixture with an acidic material to lower the pH to 7.0–8.0 is optional.

Considering for the present the condensation step of the process, as stated previously there are various ways in which the aldehydes may be brought in contact. The method of adding the condensing agent is in general not particularly critical. However, since Ca(OH)₂ is consumed as a reactant in the process, there should always be an excess of Ca(OH)₂ in the reaction mixture over and above that which has been converted to calcium formate. The pH of the reaction mixture is indicative of whether or not an excess of Ca(OH)₂ is present. A pH of at least 10 is preferred. The preferred procedure for contacting the aldehydes is to slowly and continuously add the acetaldehyde to substantially all of the formaldehyde in the form of an aqueous solution. When this procedure is employed, there are several ways in which the condensing agent may be introduced. One procedure, for example, is to slowly add the acetaldehyde to a preformed mixture of all of the condensing agent and the aqueous formaldehyde in a reaction vessel. The preferred procedure, however, is to add the acetaldehyde and the condensing agent slowly and concurrently to the aqueous formaldehyde in the reaction vessel. In this latter procedure the acetaldehyde and the condensing agent are added separately to the aqueous formaldehyde. This preferred procedure affords excellent control of reaction conditions and leads to high yields of crystalline product.

As stated, the addition of acetaldehyde is completed while the formaldehyde concentration of the reaction mixture is at least 0.8% by weight. This means that there must be an excess of formaldehyde employed over and above the 4 to 1 molar ratio theoretically required for the conversion of acetaldehyde and formaldehyde to pentaerythritol. From the standpoint of providing a practical operating process, there should be employed a molar ratio of at least 4.1. Preferably, the molar ratio should be 4.3 to 4.6. Unduly high molar ratios of formaldehyde and acetaldehyde are to be avoided. While the process of this invention is not inoperable on the basis of such high molar ratios of formaldehyde and acetaldehyde, the use thereof is wasteful of formaldehyde and hence uneconomic. The use of such high ratios further makes it necessary to destroy additional formaldehyde in the later formaldehyde reduction step. In conformity with the desirability of not employing unduly high formaldehyde to acetaldehyde molar ratios, it is desirable to carry out the condensation reaction in such a manner that at the completion of addition of acetaldehyde the formaldehyde concentration of the reaction mixture is at least 0.8% but at the same time not unduly high. Thus, it is preferred that the formaldehyde concentration of the reaction mixture at this point be within the range of 1.7% to 0.8%. While concentrations higher than 1.7% are in no way inoperable, operation under such conditions is to be avoided for the reasons above-mentioned.

As stated above, the condensation reaction is carried out in an aqueous medium. In the prior art the manufacture of pentaerythritol has almost without exception been carried out in aqueous medium. The proportions of water to the other ingredients have varied over a rather wide range. So far as this invention is concerned, any of the prior art proportions may be employed. In fact, as has been previously indicated, use of formaldehyde solutions of relatively high concentration is one means of achieving a reaction mixture having a formaldehyde concentration of at least 0.8% at the completion of the addition of acetaldehyde without employing particularly high formaldehyde to acetaldehyde mol ratios. It is preferred, however, that the aqueous formaldehyde which is employed in carrying out this invention be one having a formaldehyde concentration of from 15% to 35%. This means, of course, that when the preferred procedure for carrying out the condensation is employed, the aqueous formaldehyde solution to which the condensing agent and the acetaldehyde are added will have a formaldehyde concentration of from 15% to 35%.

The condensing agent employed is Ca(OH)₂. Actually, lime or Ca(OH)₂ may be employed. The condensing agent may be added to the reaction mixture as such or in the form of an aqueous slurry. The reaction of acetaldehyde and formaldehyde to yield pentaerythritol theoretically requires ½ mol of Ca(OH)₂ per mol of acetaldehyde. It is the practice in the art, however, to employ as much as 10% or more in excess of the theoretical amount. In the practice of this invention any of the proportions employed heretofore may be used.

While not entirely necessary it is ofttimes desirable to lower the pH of the reaction mixture after the addition of acetaldehyde has been completed. At this point there is substantially no free acetaldehyde in the reaction mixture but there is free formaldehyde present. Under highly alkaline conditions, both self-condensation of the formaldehyde and Cannizzaro reaction of the formaldehyde with itself can take place. The former reaction is particularly undesirable as previously pointed out. By reducing the alkalinity of the reaction mixture these reactions are largely avoided. Reduction to a pH of 9.0 or below is satisfactory and any acidic material such as formic acid, acetic acid, etc. may be used. This step of reducing the alkalinity is especially useful in plant operations where the reaction mixture must be held for some time before precipitation of the calcium. If the calcium is precipitated soon after the completion of the condensation step, pH reduction is not needed.

The agent for reducing the residual formaldehyde concentration of the reaction mixture is NaOH. The NaOH destroys the formaldehyde by converting it via the Cannizzaro reaction into methyl alcohol and formic acid. Sodium hydroxide is used for this step of the process for reasons previously indicated and due to the fact that it effects a smooth disappearance of the formaldehyde and provides a controllable reaction. The amount of NaOH required is necessarily a function of the amount of formaldehyde to be destroyed. The temperature and time of treatment are also factors which have a bearing on the amount of NaOH needed. In general, a temperature of from about 50° C. to about 75° C. is preferred for this step. The preferred reaction period is from about 30 min. to about 120 min.

There follow specific examples which are illustrative of the invention broadly described hereinabove. All parts and percentages in this application are by weight unless otherwise indicated.

*Example 1*

Six hundred seventy-five parts of a 20% formaldehyde-water solution (approximately 4.5 mols of formaldehyde) was added to a vessel equipped with a cooling coil and stirrer. To the solution was added 200 parts of a 20% calcium hydroxide-water slurry (approximately 0.54 mol of calcium hydroxide), the temperature being maintained at about 15° C. Forty-four parts of liquid acetaldehyde (approximately 1.0 mol) was added to the formaldehyde-calcium hydroxide mixture beneath the surface thereof during a period of 2 hours at such a rate that at no time did the concentration of the acetaldehyde in the reaction mixture build up to an appreciable value. The maximum temperature during the addition was 50° C. When the addition of the acetaldehyde was complete, the formaldehyde concentration of the reaction mixture was 1.5%. The pH of the reaction mixture was reduced to 9.0 with formic acid. While the formaldehyde concentration of the reaction mixture was still at 1.5%, all the calcium present was precipitated as calcium carbonate by the addition of 57 parts (approximately 0.54 mol) of sodium carbonate. The calcium carbonate precipitate was then removed by filtration. To the filtrate was added 40 parts of a 50% sodium hydroxide-water solution (approximately 0.5 mol) and the temperature raised to 65° C. After about 1½ hours, the formaldehyde concentration was reduced to 0.5%. Sufficient formic acid was added to reduce the pH of the mixture to between 7.0 and 8.0. The mixture was then concentrated by evaporation under reduced pressure and cooled to crystallize out the pentaerythritol. The dried product had a phthalate ester color of 2.5 to 3.0.

*Example 2*

Six hundred seventy-five parts of a 20% formaldehyde-water solution (approximately 4.5 mols of formaldehyde) were added to a vessel equipped with a cooling coil and stirrer. Two hundred parts of a 20% calcium hydroxide-water slurry (approximately 0.54 mol) and 44 parts of liquid acetaldehyde (approximately 1 mol) were added separately and simultaneously to the vessel during a period of 2 hours. The addition rate was such that the concentration of acetaldehyde in the reaction mixture at no time built up to an appreciable value. The maximum temperature during this condensation period was 50° C. When the addition of acetaldehyde was completed, the formaldehyde concentration of the reaction mixture was 1.5%. The pH of the reaction mixture was then reduced to 9.0 with formic acid. While the formaldehyde concentration of the reaction mixture was still 1.5%, the calcium was precipitated as calcium carbonate by the addition of 57 parts (approximately 0.54 mol) of sodium carbonate. The calcium carbonate precipitate was removed by filtration. To the filtrate was added 40 parts of a 50% sodium hydroxide-water solution (approximately 0.5 mol sodium hydroxide) and the temperature raised to 65° C. After about 1½ hours, the formaldehyde concentration had been reduced to 0.5%. Formic acid was then added to reduce the pH of the mixture to between 7.0 and 8.0. Finally the mixture was concentrated by evaporation under reduced pressure and cooled to crystallize out the pentaerythritol. The dried product had a phthalate ester color of 2.5–3.0.

The first step of the process herein described is referred to as "condensing" formaldehyde and acetaldehyde in the presence of a condensing agent to yield pentaerythritol. As is well known in the art, the chemical reaction here involved is not just a simple condensation. In fact, there are two different reactions taking place: (1) aldol condensation of the formaldehyde and acetaldehyde to yield trimethylol acetaldehyde and (2) reaction of the trimethylol acetaldehyde with formaldehyde by what is known as the Cannizzaro reaction to provide pentaerythritol and formic acid (which in the presence of calcium ions form calcium formate). It will be understood, therefore, that the term "condensing" and related terms are used herein in a sense to include the reactions involved in making pentaerythritol from acetaldehyde and formaldehyde and is not to be construed as limited to what is strictly speaking a condensation reaction.

The condensation step of the process may be conducted under such conditions with respect to temperature as have been employed heretofore in the prior art. Due to the fact that the reactions involved are exothermic, there will be some variation in the temperature of the reaction mixture in any practical use of the invention. The temperature of the reaction mixture is best controlled by using the technique previously described of slowly adding the Ca(OH)$_2$ and the acetaldehyde separately and concurrently to the aqueous formaldehyde in the reaction vessel. For best results it is preferred to carry out the reaction under such conditions that the temperature is not over 50° C.

In the examples the calcium ions were precipitated by use of $Na_2CO_3$. In general, any known precipitating agent for calcium ions may be employed. Examples are $Na_2CO_3$, $H_2SO_4$, $Na_2SO_4$, $H_2C_2O_4$, $Na_2C_2O_4$, etc. Water-soluble carbonates such as $Na_2CO_3$ are very effective.

When caustic soda is used to reduce the residual formaldehyde content of the reaction mixture, the resulting reaction mixture is usually highly alkaline. It is preferred to reduce the alkalinity by addition of an acidic material in such amount that a pH of 7.0 to 8.0 obtains. Suitable materials are formic acid, acetic acid, etc.

After the reaction mixture has been treated to reduce the residual formaldehyde content, it is then in condition to be treated for recovery of pentaerythritol. Any of the known recovery procedures may be used for this purpose.

The salient advantage of this invention is that it provides pentaerythritol which is much improved with respect to phthalate ester color as compared with the pentaerythritol which normally results from calcium-condensed reactions. As evidenced by the examples, it is quite possible by utilizing the principles underlying this invention to make pentaerythritol having phthalate ester colors of the order of 2.5 to 3.5. At the same time crystalline pentaerythritol is obtained in the process of this invention in equally as high yield, based on the acetaldehyde, as in the conventional lime-condensed reactions. Furthermore, the pentaerythritol monomer content of the crystalline pentaerythritol is at least as high and in some cases higher as compared with products of the conventional lime-condensed reactions.

The phthalate ester color test referred to hereinabove consists in reacting pentaerythritol with reagent grade phthalic anhydride and measuring the color of a ⅞" thickness of the resulting ester.

Spectrophotometric readings on numerous samples of pentaerythritol-phthalate esters prepared by the method outlined below have indicated that the colors can be graded on the $x$-trichromatic scale, basis of Illuminant C. Accordingly, this scale has been arbitrarily divided into equal intervals over the range of color likely to be encountered, and these numbered from 0 to 10.

For practical application this color scale has been duplicated by the use of Lovibond glasses for visual comparison.

| PE-Ester Color | Yellow (Series 510) | Red (Series 200) |
|---|---|---|
| 1 | 1.0 | 0.1 |
| 2 | 2.5 | 0.8 |
| 3 | 4.6 | 1.7 |
| 4 | 7.2 | 2.5 |
| 5 | 10.2 | 3.5 |
| 6 | 14. | 4.5 |
| 7 | 19. | 5.7 |
| 8 | 26. | 7.1 |
| 9 | 37. | 9. |

In carrying out the test phthalic anhydride, Merck's reagent grade, sublimed M. P. 129–131° C. or equivalent is employed. For making the ⅞" thicknesses of the phthalate ester there are employed the standard size rosin color molds. Adjust the temperature of an oil bath from 220–225° C. and maintain it within this range for the duration of the test with the aid of a hot plate, electric heater or flame. Clamp a test tube in the heated oil bath so that it is about 0.5 immersed in the oil and add 29.5 g. of phthalic anhydride. Place a thermometer in the tube and stir the anhydride gently until it becomes molten and is heated to 218–220° C. Add 7.5±0.05 g. of the pentaerythritol to be tested all at once. Stir the contents of the test tube with the thermometer until the temperature reaches 215° C. Allow the tube and contents to remain in the bath for a total of 30 minutes from the time of addition of the pentaerythritol, remove and pour into a rosin color mold which has previously been heated to 100–140° C. Allow the mold and contents to cool slowly to room temperature and compare the color with the standards reading to the nearest 0.5 grade.

The term "formaldehyde concentration" as used herein means the free formaldehyde concentration of the mixture or composition involved as determined by means of a polarograph.

What I claim and desire to protect by Letters Patent is:

1. The process for preparing pentaerythritol which comprises condensing formaldehyde and acetaldehyde in the presence of $Ca(OH)_2$ as condensing agent by slowly adding acetaldehyde to substantially all of the formaldehyde which is in the form of an aqueous solution containing condensing agent, the aldehydes being employed in such proportions that at the time the acetaldehyde has been completely added the formaldehyde concentration of the reaction mixture is at least 0.8% by weight, completing the addition of acetaldehyde while the formaldehyde concentration of the reaction mixture is at least 0.8% by weight, precipitating the calcium from the reaction mixture after the acetaldehyde has been completely added and while the formaldehyde concentration of the reaction mixture is at least 0.8% by weight, subjecting the reaction mixture to the following two treatments in any order: removal of the precipitate and treatment of the reaction mixture with NaOH to reduce the residual formaldehyde concentration via the Cannizzaro reaction, and finally recovering the pentaerythritol from the resulting reaction mixture of reduced formaldehyde content.

2. The process for preparing pentaerythritol which comprises condensing formaldehyde and acetaldehyde in the presence of $Ca(OH)_2$ as condensing agent by slowly adding acetaldehyde to substantially all of the formaldehyde which is in the form of an aqueous solution containing condensing agent, the aldehydes being employed in such proportions that at the time the acetaldehyde has been completely added the formaldehyde concentration of the reaction mixture is within the range of from 1.7% to 0.8% by weight, completing the addition of acetaldehyde while the formaldehyde concentration of the reaction mixture is within the range of from 1.7% to 0.8% by weight, precipitating the calcium from the reaction mixture after the acetaldehyde has been completely added and while the formaldehyde concentration of the reaction mixture is within the range of from 1.7% to 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

3. The process for preparing pentaerythritol which comprises condensing formaldehyde and acetaldehyde in the presence of Ca(OH)₂ as condensing agent by slowly adding acetaldehyde to substantially all of the formaldehyde which is in the form of an aqueous solution containing condensing agent, the aldehydes being employed in such proportions that at the time the acetaldehyde has been completely added the formaldehyde concentration of the reaction mixture is within the range of from 1.7% to 0.8% by weight, the aqueous formaldehyde employed having a formaldehyde concentration in the range of from 15% to 35%, completing the addition of acetaldehyde while the formaldehyde concentration of the reaction mixture is within the range of from 1.7% to 0.8% by weight, precipitating the calcium from the reaction mixture after the acetaldehyde has been completely added and while the formaldehyde concentration of the reaction mixture is within the range of from 1.7% to 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

4. The process for preparing pentaerythritol which comprises condensing formaldehyde and acetaldehyde in the presence of Ca(OH)₂ as condensing agent by slowly adding acetaldehyde and condensing agent separately and concurrently to substantially all of the formaldehyde in the form of an aqueous solution, the aldehydes being employed in such proportions that at the time the acetaldehyde has been completely added the formaldehyde concentration of the reaction mixture is within the range of from 1.7% to 0.8% by weight, the aqueous formaldehyde employed having a formaldehyde concentration in the range of from 15% to 35%, completing the addition of acetaldehyde while the formaldehyde concentration of the reaction mixture is within the range of from 1.7% to 0.8% by weight, precipitating the calcium from the reaction mixture after the acetaldehyde has been completely added and while the formaldehyde concentration of the reaction mixture is within the range of from 1.7% to 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

5. The process of claim 4 wherein the temperature at which the condensation step is carried out is not over 50° C.

6. The process of claim 5 wherein the step of reducing the residual formaldehyde concentration of the reaction mixture with NaOH the formaldehyde concentration is reduced to at most 0.6% by weight of the reaction mixture.

7. The process of claim 6 wherein the step of reducing the residual formaldehyde concentration of the reaction mixture with NaOH is carried out at a temperature not above 75° C.

8. The process of claim 7 wherein Na₂CO₃ is used to precipitate the calcium.

9. The process of claim 8 wherein the reaction mixture, following the step in which the residual formaldehyde concentration thereof is reduced with NaOH, is treated with an acidic material to reduce the pH to a pH of 7.0 to 8.0.

10. The process for preparing pentaerythritol by condensing formaldehyde and acetaldehyde in the presence of Ca(OH)₂ as condensing agent which comprises admixing substantially all of the formaldehyde which is in the form of an aqueous solution and condensing agent, slowly adding acetaldehyde to the aqueous formaldehyde-condensing agent admixture, the aldehydes being employed in such proportions that at the time the acetaldehyde has been completely added the formaldehyde concentration of the reaction mixture is within the range of from 1.7% to 8.0% by weight, the aqueous formaldehyde employed having a formaldehyde concentration in the range of from 15% to 35%, completing the addition of acetaldehyde while the formaldehyde concentration of the reaction mixture is within the range of from 1.7% to 0.8% by weight, precipitating the calcium from the reaction mixture after the acetaldehyde has been completely added and while the formaldehyde concentration of the reaction mixture is within the range of from 1.7% to 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

11. The process of claim 10 wherein the temperature at which the condensation step is carried out is not over 50° C.

12. The process of claim 11 wherein in the step of reducing the residual formaldehyde concentration of the reaction mixture with NaOH the formaldehyde concentration is reduced to at most 0.6% by weight of the reaction mixture and wherein the temperature during said step is not over 75° C.

13. The process of claim 3 wherein a water-soluble carbonate is used to precipitate the calcium.

14. The process of claim 13 wherein Na₂CO₃ is employed as the water-soluble carbonate to precipitate the calcium.

15. The process for preparing pentaerythritol which comprises condensing formaldehyde and acetaldehyde in the presence of Ca(OH)₂ as condensing agent by slowly adding acetaldehyde to substantially all the formaldehyde which is in the form of an aqueous solution containing condensing agent, the aldehydes being employed in such proportions that at the time the acetaldehyde has been completely added the formaldehyde concentration of the reaction mixture is within the range of from 1.7% to 0.8% by weight, the aqueous formaldehyde employed having a formaldehyde concentration in the range of from 15% to 35%, completing the addition of acetaldehyde while the formaldehyde concentration of the reaction mixture is within the range of from 1.7% to 0.8% by weight, precipitating the calcium from the reaction mixture after the acetaldehyde has been completely added and while the formaldehyde concentration of the reaction mixture is within the range of from 1.7% to 0.8% by weight, removing the resulting precipitate, treating the resulting calcium-free reaction mixture with NaOH at a temperature not exceeding 75° C. to reduce the residual formaldehyde concentration via the Cannizzaro reaction, and recovering the pentaerythritol from the resulting reaction mixture of reduced formaldehyde content.

16. The process for preparing pentaerythritol which comprises condensing formaldehyde and acetaldehyde in the presence of Ca(OH)₂ as condensing agent by slowly adding acetaldehyde to substantially all the formaldehyde which is in the form of an aqueous solution containing condensing agent, the aldehydes being employed in such proportions that at the time the acetaldehyde has been completely added the formaldehyde concentration of the reaction mixture is within the range of from 1.7% to 0.8% by weight, the aqueous formaldehyde employed having a formaldehyde concentration in the range of from 15% to 35%, the temperature during said condensation step being not over 50° C., completing the addition of acetaldehyde while the formaldehyde concentration of the reaction mixture is within the range of from 1.7% to 0.8% by weight, precipitating the calcium from the reaction mixture after the acetaldehyde has been completely added and while the formaldehyde concentration of the reaction mixture is within the range of from 1.7% to 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

17. The process for preparing pentaerythritol which comprises condensing formaldehyde and acetaldehyde in the presence of $Ca(OH)_2$ as condensing agent by slowly adding acetaldehyde to substantially all the formaldehyde which is in the form of an aqueous solution containing condensing agent, the aldehydes being employed in such proportions that at the time the acetaldehyde has been completely added the formaldehyde concentration of the reaction mixture is at least 0.8% by weight, completing the addition of acetaldehyde while the formaldehyde concentration of the reaction mixture is at least 0.8% by weight, precipitating the calcium from the reaction mixture after the acetaldehyde has been completely added and while the formaldehyde concentration of the reaction mixture is at least 0.8% by weight, treating the resulting reaction mixture containing precipitated calcium with NaOH to reduce the residual formaldehyde concentration via the Cannizzaro reaction, removing the precipitated calcium, and recovering pentaerythritol from the resulting reaction mixture.

18. The process for preparing pentaerythritol which comprises condensing formaldehyde and acetaldehyde in the presence of $Ca(OH)_2$ as condensing agent by slowly adding acetaldehyde to substantially all of the formaldehyde which is in the form of an aqueous solution containing condensing agent, the aldehydes being employed in such proportions that at the time the acetaldehyde has been completely added the formaldehyde concentration of the reaction mixture is at least 0.8% by weight, completing the addition of acetaldehyde while the formaldehyde concentration of the reaction mixture is at least 0.8% by weight, treating the reaction mixture with an acidic material to lower the pH to at most 9.0, precipitating the calcium from the reaction mixture after the acetaldehyde has been completely added and while the formaldehyde concentration of the reaction mixture is at least 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

19. The process for preparing pentaerythritol which comprises condensing formaldehyde and acetaldehyde in the presence of $Ca(OH)_2$ as condensing agent by slowly adding acetaldehyde to formaldehyde which is in the form of an aqueous solution containing condensing agent, the formaldehyde concentration of the reaction mixture during the entire period of addition of acetaldehyde being at least 0.8% by weight, the aldehydes being employed in such proportions that at the time the acetaldehyde has been completely added the formaldehyde concentration of the reaction mixture is at least 0.8% by weight, completing the addition of acetaldehyde while the formaldehyde concentration of the reaction mixture is at least 0.8% by weight, precipitating the calcium from the reaction mixture after the acetaldehyde has been completely added and while the formaldehyde concentration of the reaction mixture is at least 0.8% by weight, removing the resulting precipitate, treating the resulting calcium-free reaction mixture with NaOH to reduce the residual formaldehyde concentration via the Cannizzaro reaction, and recovering the pentaerythritol from the resulting reaction mixture of reduced formaldehyde content.

CHARLES W. GOULD.

REFERENCES CITED

The following references are of record in the file of this patent:

UNITED STATES PATENTS

| Number | Name | Date |
|---|---|---|
| 2,011,589 | Paterson | Aug. 20, 1935 |
| 2,329,514 | Cox | Sept. 14, 1943 |
| 2,401,749 | Burghardt | June 11, 1946 |